United States Patent
Lai (10) Patent No.: US 9,964,243 B1
(45) Date of Patent: May 8, 2018

(54) PIPE JOINT STRUCTURE

(71) Applicant: Hung-Lin Lai, Changhua (TW)

(72) Inventor: Hung-Lin Lai, Changhua (TW)

(73) Assignee: Wen Sheng Fu Co. Ltd., Changhua (TW)

( * ) Notice: Subject to any disclaimer, the term of this patent is extended or adjusted under 35 U.S.C. 154(b) by 0 days. days.

(21) Appl. No.: 15/467,845

(22) Filed: Mar. 23, 2017

(51) Int. Cl.
 *F16L 19/12* (2006.01)
 *F16L 19/00* (2006.01)
 *F16L 19/02* (2006.01)
 *F16L 35/00* (2006.01)

(52) U.S. Cl.
 CPC .............. *F16L 19/12* (2013.01); *F16L 19/005* (2013.01); *F16L 19/0206* (2013.01); *F16L 19/0218* (2013.01)

(58) Field of Classification Search
 CPC ....................................................... F16L 37/092
 USPC ............................ 285/39, 345, 104, 322, 308
 See application file for complete search history.

(56) References Cited

U.S. PATENT DOCUMENTS

| | | | | | |
|---|---|---|---|---|---|
| 2,466,526 A | * | 4/1949 | Wolfram | ................. | F16L 19/12 285/104 |
| 4,471,978 A | * | 9/1984 | Kramer | ................... | B60T 17/04 285/136.1 |
| 5,024,468 A | * | 6/1991 | Burge | .................... | F16L 37/092 285/308 |
| 5,328,215 A | * | 7/1994 | Grenier | ............... | F16L 37/0925 285/105 |
| 5,496,073 A | * | 3/1996 | Grenier | ................. | F16L 19/086 285/322 |
| 5,553,895 A | * | 9/1996 | Karl | ...................... | F16L 37/088 285/308 |
| 5,580,100 A | * | 12/1996 | Umezawa | ........... | F16L 37/0925 285/308 |
| 5,685,575 A | * | 11/1997 | Allread | .................. | F16L 37/088 285/308 |
| 5,934,709 A | * | 8/1999 | Morrison | ............ | F16L 37/0842 285/315 |
| 6,305,721 B1 | * | 10/2001 | Heinrichs | ............. | B60T 17/043 285/23 |
| 7,543,858 B1 | * | 6/2009 | Wang | .................. | F16L 37/0982 285/314 |
| 2003/0067165 A1 | * | 4/2003 | Muto | .................... | B21D 39/048 285/322 |
| 2004/0012201 A1 | * | 1/2004 | Bartholoma | .......... | F16L 37/088 285/39 |
| 2004/0108712 A1 | * | 6/2004 | Liang | .................. | F16L 37/0925 285/39 |

\* cited by examiner

*Primary Examiner* — Aaron M Dunwoody
(74) *Attorney, Agent, or Firm* — Che-Yang Chen; Law offices of Scott Warmuth (57) ABSTRACT

A pipe joint structure may include a joint body, an O-ring seal piece, an auxiliary retaining ring, a nut lock, and a connecting base, wherein the joint body has a first opening and a second opening connecting and transmitting through with each other, a cam ring is configured in the first opening, a first thread section is configured on the outer margin of the joint body corresponding to the first opening, the auxiliary retaining ring has a first end, a second end, an inner ring portion, and an outer ring portion, a function inclined plane is formed by cone shape expansion in the middle part of the inner ring portion toward the first end, a second thread section and a stepped blocking portion are configured in the inner margin of the lock nut.

4 Claims, 8 Drawing Sheets

PRIOR ART

FIG. 11

PRIOR ART

PIPE JOINT STRUCTURE

BACKGROUND OF THE INVENTION

The present invention relates to a pipe joint structure, especially a pipe joint structure with the excellent fixation force.

Figure 10:
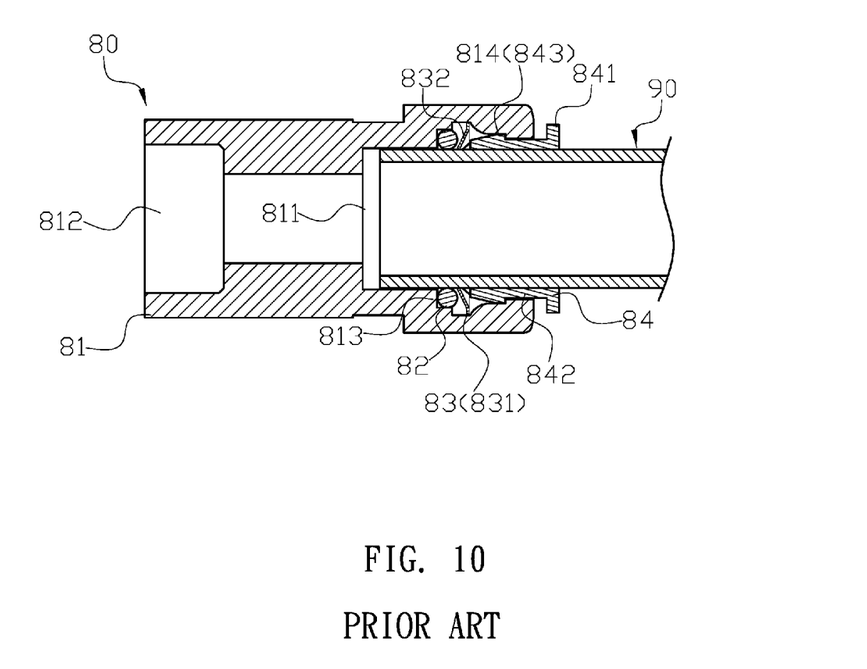
FIG. 10 is the view of the conventional pipe joint structure.

The conventional pipe joint structures nowadays are mostly those shown in FIG. 10. The pipe joint (80) mainly comprises: a joint body (81), an O-ring seal piece (82), a snap ring (83), and a connecting base (84). Therein, the joint main body (81) has a first opening (811) and a second opening (812) connecting and transmitting through each other. A cam ring (813) and a circular groove (814) are configured inside of the first opening (811). A snap ring (83) has a circular elastic flange (831) and a plurality of break gear teeth (832) configured on the circular elastic flange (831). An one end of the connecting base (84) is configured with an enlarged lug (841) wherein the enlarged lug serves for pressing the connecting base (84) inward, and another end of the connecting base (84) has a plurality of spring plates (842) separated from each other with space between, and each of the out lateral of the spring plate (842) has a undercut (843) formed. While using the pipe joint (80), the O-ring seal piece (82), snap ring (83), and the end of the connecting base (84) having the spring plate (842) will be sequentially placed into the internal of the joint main body (81) from the first opening (811) so that the O-ring seal piece (82) and the snap ring (83) can be limited on the cam ring (813), and the undercut (843) of the connecting base (84) can inherently snap into the circumferential concave (814) of the joint body (81). When the brass pipe (90) through towards the first opening (811) of the joint body (81) from the inner circumferential section of the connecting base (84), the break gear teeth (832) of the snap ring (83) will slightly embed the brass pipe (90) so that the brass pipe (90) can connect to the water equipment via the pipe joint (80).

Figure 11:
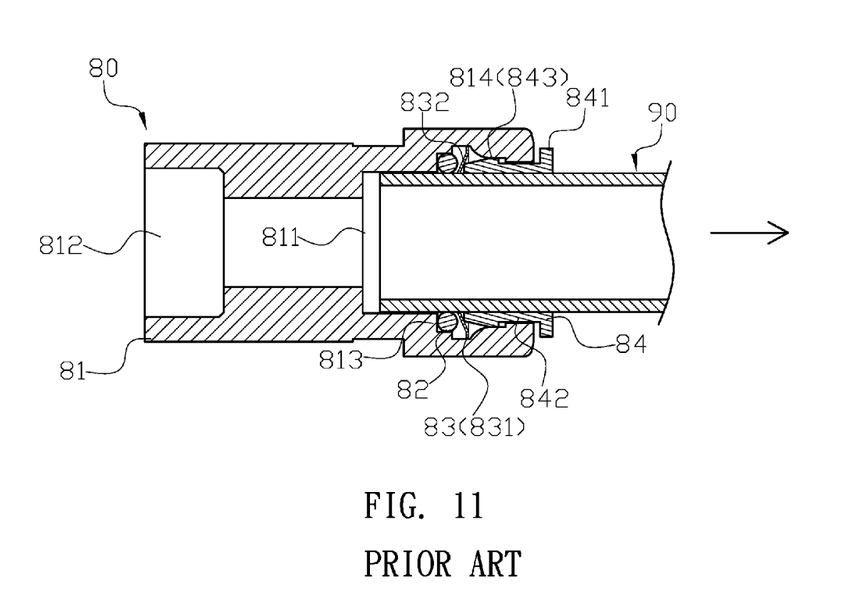
FIG. 11 is the view showing that the brass pipe in the conventional pipe joint structure is vulnerable to be taken off.
Figure 12:
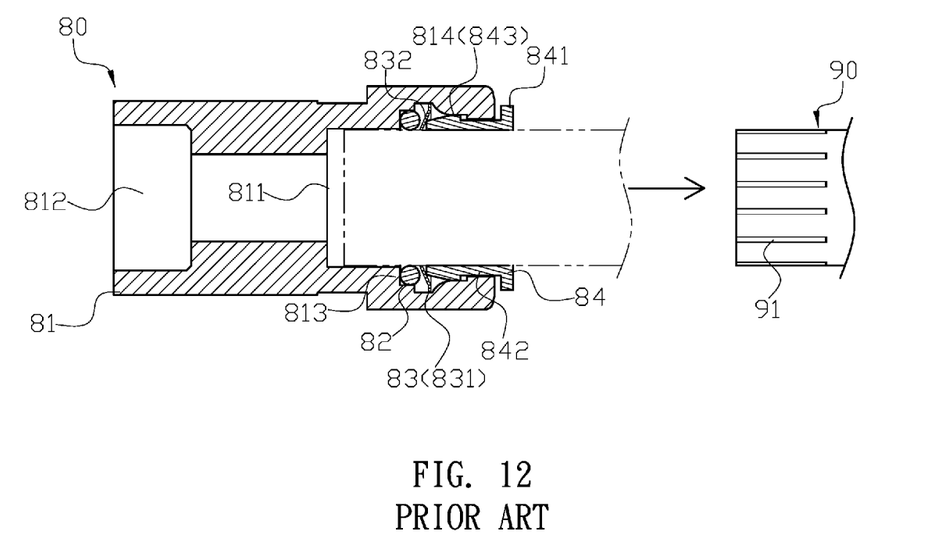
FIG. 12 is the view showing the scratches on the conventional pipe joint structure after the brass pipe is taken off.

Nevertheless, the conventional pipe joint structure mentioned above still has the following problems in the actual application: that the pipe joint (80) merely using the break gear teeth (832) of the snap ring (83) to slightly embed the brass pipe (90) has the drawback of the weaker fixation force, that leads the brass pipe (90) separated from the pipe joint (80) under the pull force (referring to FIG. 11), and during the separation, the break gear teeth (832) scratches the brass pipe (90) and leave long scratches (91) on the surface of the brass pipe (90) (referring to FIG. 12). The long depression scratches (91) can cause the brass pipe (90) unable to completely adhere to the pipe joint (80) when re-jointing, which is the main reason that the water equipment is accompanied by leakage problem.

Therefore, the development and improvement to solve the above shortages of the conventional pipe joint structure is an object for the related industry to put effort on. In view of this, the inventor has been motivated and obtained the present invention by years of designing experience, multi discussion, testing sample, and repeatedly amendment for improvement.

BRIEF SUMMARY OF THE INVENTION

The technical problem needs to be solved by the present invention is that the pipe joint structure merely using the break gear teeth of the snap ring to slightly embed the brass pipe has the drawback of the weaker fixation force.

Technical feature of the present invention for solving the above problem is to provide a pipe joint structure, comprising: a joint body, an O-ring seal piece, an auxiliary retaining ring, a lock nut, and a connecting base, wherein the joint body has a first opening and a second opening connecting and transmitting through with each other, a cam ring is configured in the first opening, a first thread section is configured on the outer margin of the joint body corresponding to the first opening, the auxiliary retaining ring has a first end, a second end, an inner ring portion, and an outer ring portion, a function inclined plane is formed by cone shape expansion in the middle part of the inner ring portion toward the first end, a second thread section and a stepped blocking portion are configured in the inner margin of the lock nut so that a one end of the nut formed with the stepped blocking portion configures a shrinkage section, the connecting base is a hollow ring body with a one end configured an enlarged lug so that the enlarged lug is for pressing the connecting base inward, another end of the connecting base has a plurality of spring plates separated from each other with space between and stretched out, metal claws and undercuts are respectively configured inside and outside of the spring plates, and a gradually shrinkage inclined portion is formed on the outer margin of the undercut toward the side of the spring plates. Accordingly, a pipe joint structure is obtained.

Comparing the effectiveness of the present invention to the prior arts, the present invention provides a pipe joint structure, which uses the lock nut to be tightly locked, by using the connecting base to push the auxiliary retaining rings forward closely to the O-ring seal piece so that the O-ring seal piece will be pressed by the auxiliary retaining ring for more assured that the brass pipe is tightened up, and using the contact of the function inclined plane and the inclined portion to active the spring plates shrinking inwardly so that the metal claws will embed the brass pipe more, which can make the brass pipe to obtain more positions fixing in the pipe joint. Such that there will be no separation happened between the brass pipe and the pipe joint under the pull force and avoid the scratches on the brass pipe that causes leakage, where the scratches are caused by the metal claws scratching the brass pipe.

DETAILED DESCRIPTION OF THE INVENTION

Figure 1:
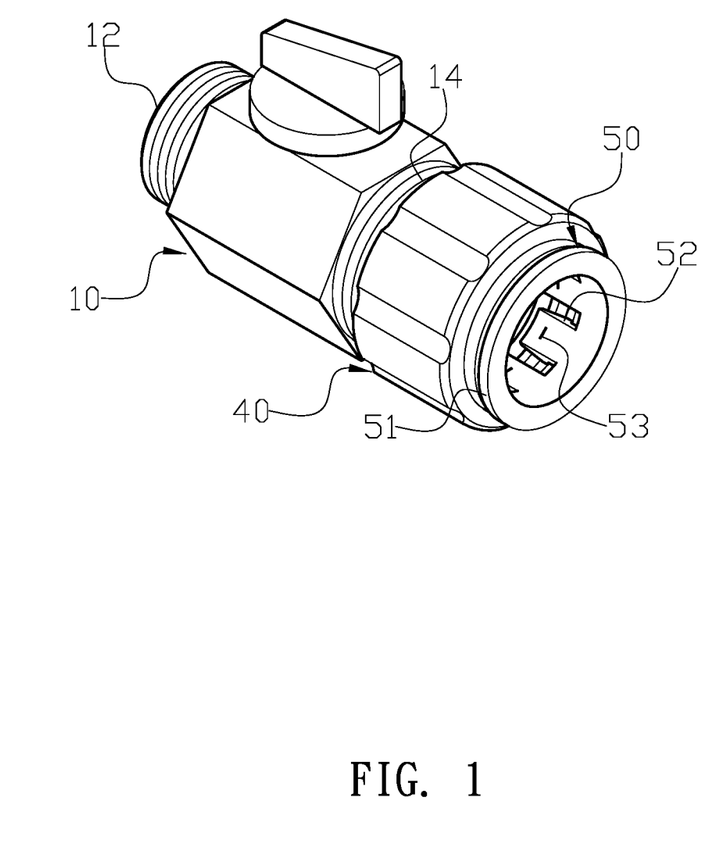
FIG. 1 is the perspective view of the pipe joint structure combination of the present invention.
Figure 2:
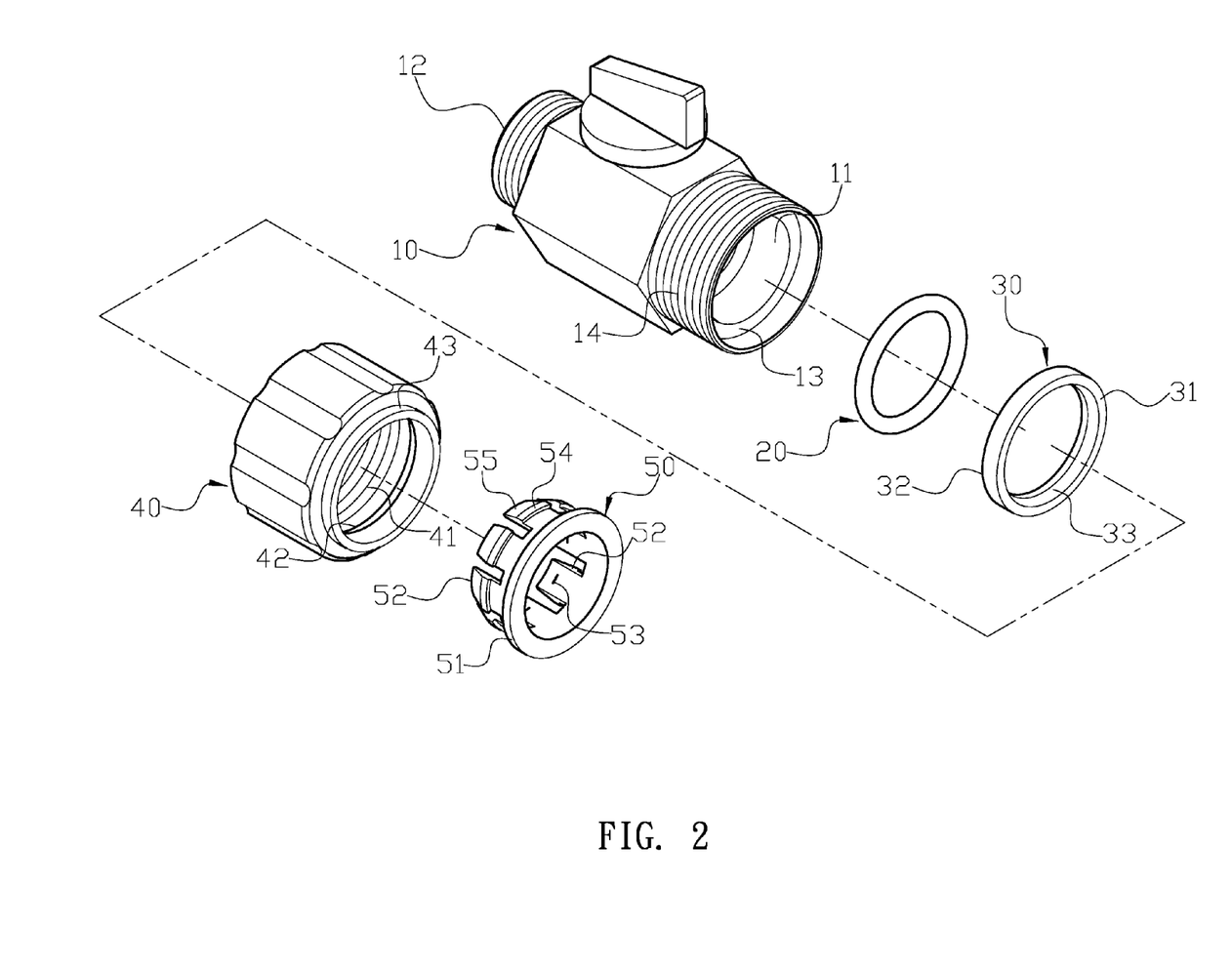
FIG. 2 is the exploded view of the pipe joint structure combination of the present invention.
Figure 3:
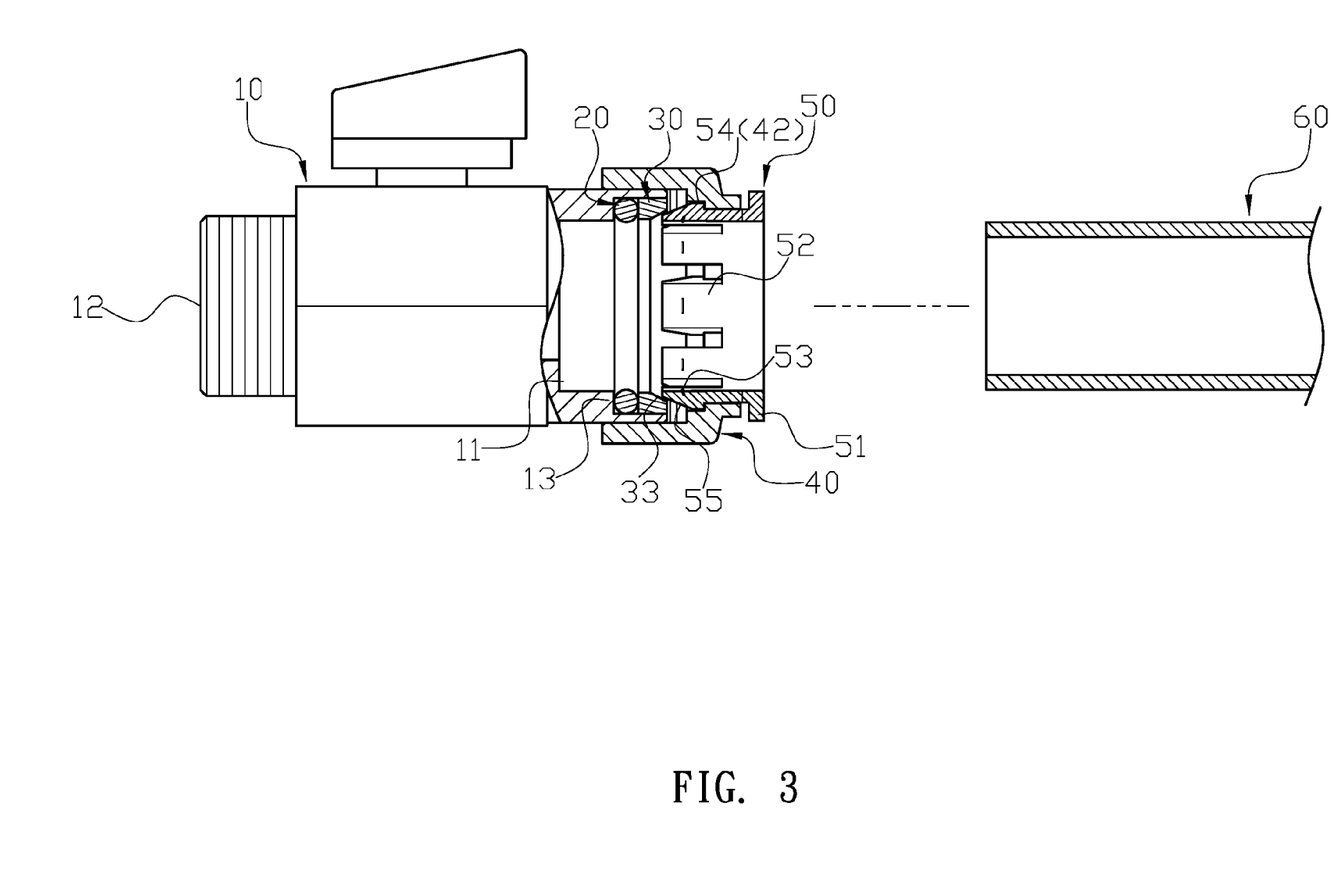
FIG. 3 is the sectional view of the pipe joint structure combination of the present invention.

In order for the examiner to have further acknowledge and understandings to the object, characteristic, and effectiveness of the present invention, please refer to the drawings for the embodiments. The detailed description of the present invention are as followed:

Firstly, please sequentially refer to FIG. 1 to FIG. 3. The pipe joint structure comprises a joint body (10), an O-ring seal piece (20), an auxiliary retaining ring (30), a lock nut (40), and a connecting base (50). Therein, the joint body (10) has a first opening (11) and a second opening (12) connecting and transmitting through with each other. A cam ring (13) is configured in the first opening (11). A first thread section (14) is configure on the outer margin of the joint body (10) corresponding to the first opening (11). The auxiliary retaining ring (30) has a first end (31), a second end (32), an inner ring portion, and an outer ring portion. A function inclined plane (33) is formed by cone shape expansion in the middle part of the inner ring portion toward the first end (31). A second thread section (41) and a stepped blocking portion (42) are configured in the inner margin of the lock nut (40) so that a one end of the lock nut (40) formed with the stepped blocking portion (42) is configured with a shrinkage section (43). The connecting base (50) is a hollow ring body with a one end configured an enlarged lug (51) so that the enlarged lug (51) is for pressing the connecting base (50) inward. Another end of the connecting base (50) has a plurality of spring plates (52) separated from each other with space between and stretched out, metal claws (53) and undercuts (54) are respectively configured inside and outside of the spring plates (52). A gradually shrinkage inclined portion (55) is formed on the outer margin of the undercut (54) toward the side of the spring plates (52).

Please refer to FIG. 1 to FIG. 3 for the combination of the pipe joint structure. The O-ring seal piece (20) is placed in the first opening (11) of the joint body (10) so that the O-ring seal piece (20) can be loaded on the cam ring (13) of the joint body (10). The connecting base (50) transmits from the shrinkage section (43) into the lock nut (40) from one end of the lock nut (40) with the spring plates (52) so that the undercut (54) and the stepped blocking portion (42) can limit each other and the lock nut can cover the auxiliary retaining ring (30). When the lock nut (40) uses the second thread section (41) to thread with the first thread section (14) on the joint body (10), the auxiliary retaining ring (30) is placed between the connecting base (50), and the O-ring seal piece (20) and the first end (31) are adjacent to the spring plates (52). Such of these obtains a complete pipe joint structure for use.

Figure 4:
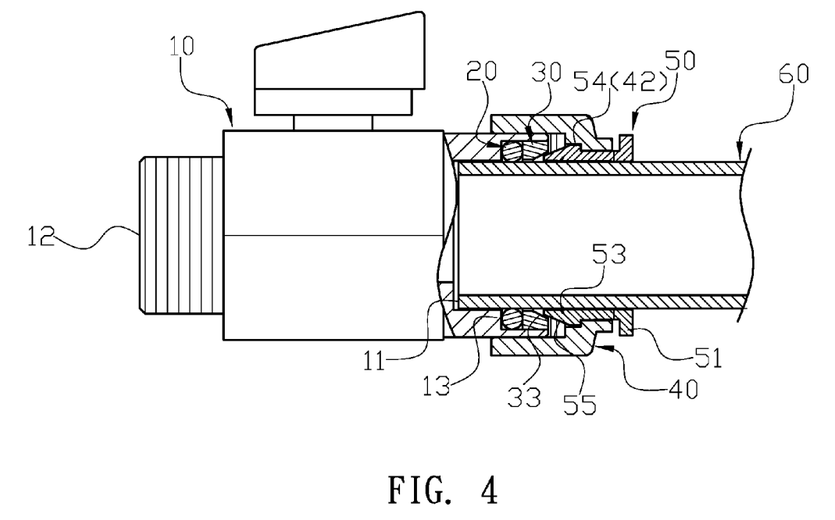
FIG. 4 is the view of connecting the brass pipe and the pipe joint structure of the present invention.
Figure 5:
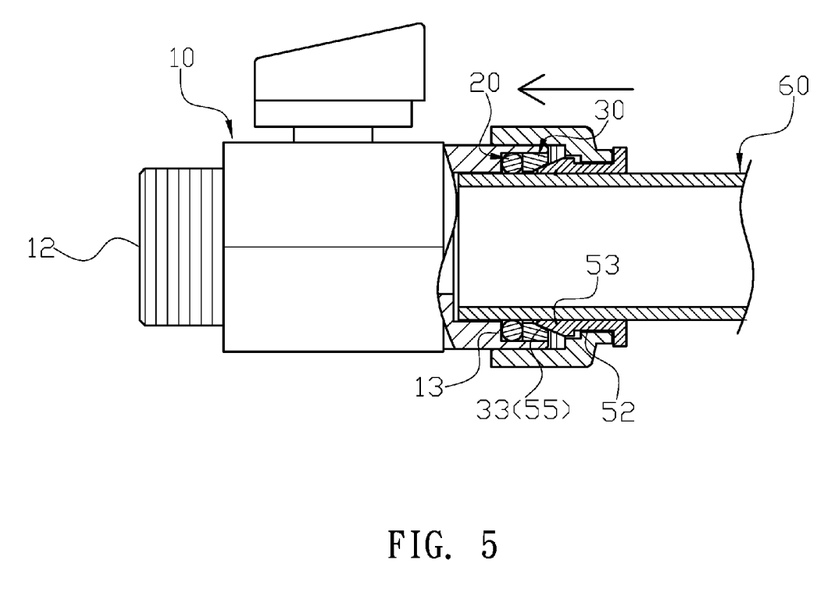
FIG. 5 is the view of locking the lock nut of the of pipe joint structure of the present invention.
Figure 6:
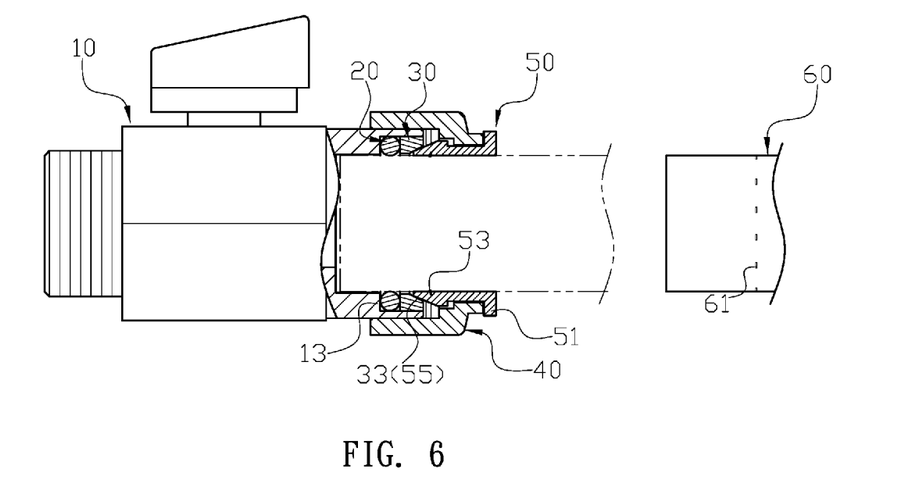
FIG. 6 is the view of taking the brass pipe off the pipe joint structure of the present invention.

In the actual application, the brass pipe (60) transmits from the inner ring portion of the connecting (50) to the first opening (11) of the joint body (10), so that the metal claws (53) embed the brass pipe (60) (please referring to FIG. 4) for the brass pipe (60) can primarily connect to the water equipment via the pipe joint structure. Further, the brass (60) can be locked tightly via lock nut (40) by the connecting base (50) pushing the auxiliary retaining ring (30) forward the O-ring seal piece (20) (please referring to FIG. 5), so that the O-ring seal piece (20) will be pressed by the auxiliary retaining ring (30), which is for more assuring that the brass pipe is tightened up. And, the function inclined plane (33) is used to contact the inclined portion (55) for the spring plates (52) shrinking inwardly so that the metal claws (53) can embed the brass pipe (60) more, which is for the brass pipe (60) to obtain more positions fixing in the pipe joint structure. Such of these can have no separation happened between the brass pipe (60) and the pipe joint structure under the pull force, avoiding the scratches that is done by the metal claws (60) to the brass pipe (60) and causes leakage, and avoiding the spot bite marks (61) that appears when the brass pipe (60) is loosen from the pipe joint structure via the lock nut (40) due to the damage caused by re-jointing (please referring to FIG. 6).

The present invention provides a joint pipe structure, wherein the first opening (10) and the second opening of the joint body (10) is transmit in a straight line way (please referring to FIG. 1 to FIG. 6).

Figure 7:
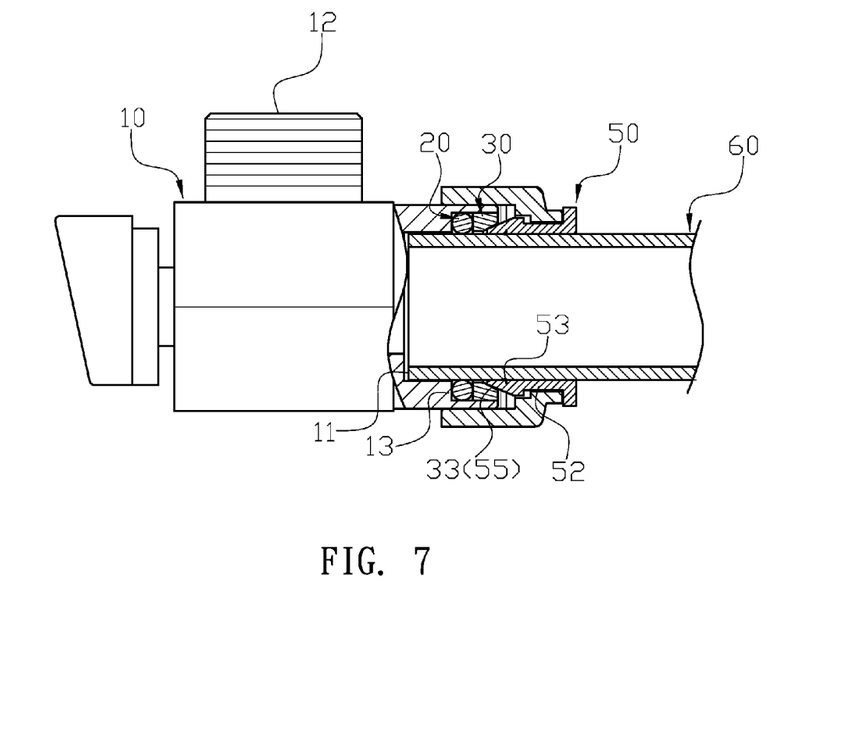
FIG. 7 is the view of another embodiment of the present invention.

The present invention provides a joint pipe structure, wherein the first opening (10) and the second opening of the joint body (10) is transmit in a corner line way (please referring to FIG. 7).

Figure 8:
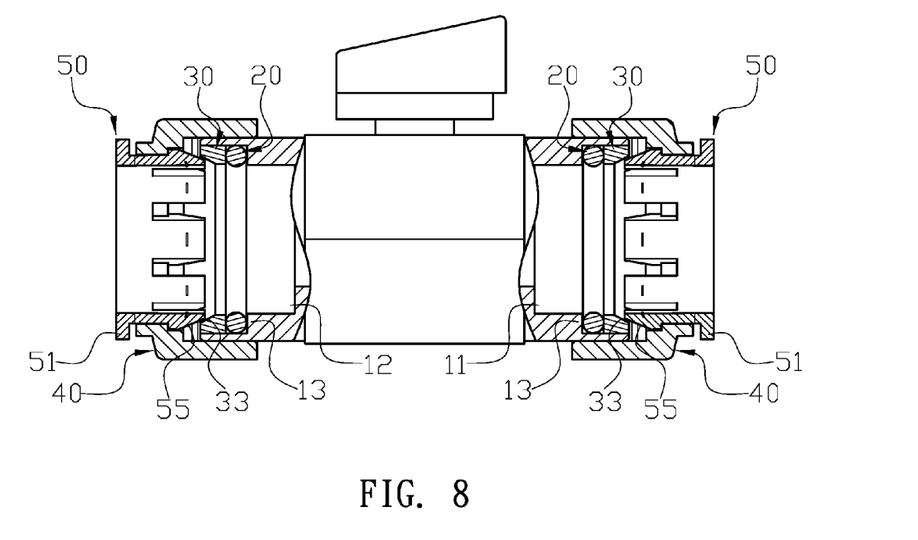
FIG. 8 is the view of another embodiment of the present invention.

The present invention provides a pipe joint structure, wherein the second opening (10) of the joint body (10) is also installed with the O-ring seal piece (20), the auxiliary retaining ring (30), the lock nut (40), and the connecting base (50), and a pair of pipe joint structure is obtained by the configuration of those (please referring to FIG. 8).

Figure 9:
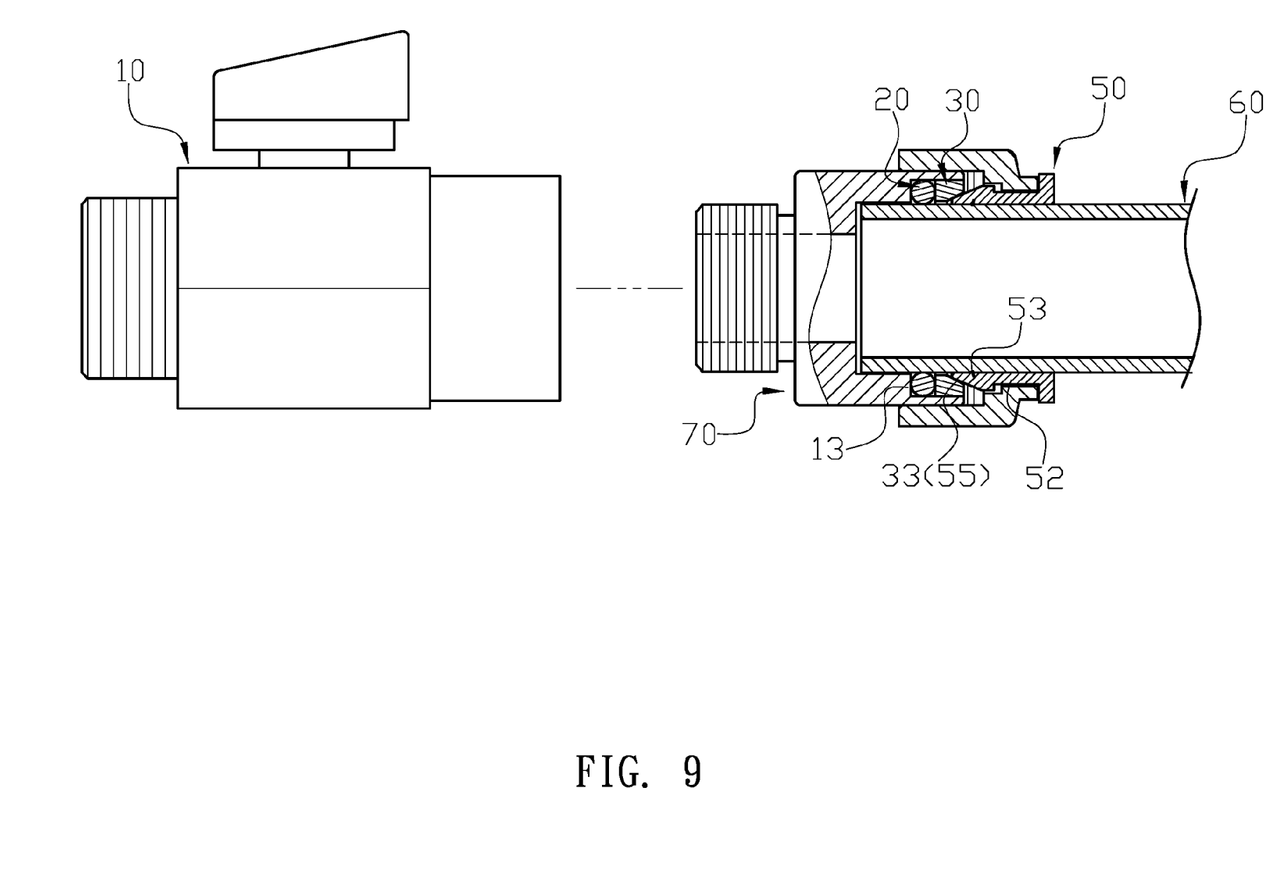
FIG. 9 is the view of another embodiment of the present invention.

The present invention provides a pipe joint structure, wherein the combination of the O-ring seal piece (20), the auxiliary retaining ring (30), the lock nut (40), the connecting base (50) is via an adapter (70) connecting to the joint body (10) (please referring to FIG. 9).

The present invention provides a pipe joint structure, wherein the metal claws (53) combine with the spring plates (52) by stretching to cover, and the metal claws (53) is slightly protruding to the inner margin of the spring plates.

As above, the present invention has achieved a breakthrough of structure design and improvement as well as obtained the novelty and inventive steps. The present invention has not been published and thus has novelty under the patent articles. Therefore, the present invention has been submitted as a utility model application according to the patent article. Earnestly please the examiner of the patent office to examine and approve the present invention.

The above is the detailed description of the present invention. However, the above is merely the preferred embodiment of the present invention and cannot be the limitation to the implement scope of the present invention, which means the variation and modification according the present invention may still fall into the scope of the invention.

What is claimed is:

1. A pipe joint structure comprising a joint body, an O-ring seal piece, an auxiliary retaining ring, a lock nut, and a connecting base, wherein the joint body has a first opening and a second opening connecting and transmitting through with each other and a cam ring is configured in the first opening;

the auxiliary retaining ring has a first end, a second end, an inner ring portion, and an outer ring portion and a function inclined plane is formed by cone shape expansion in the middle part of the inner ring portion toward the first end;

a second thread section and a stepped blocking portion are configured in the inner margin of the lock nut, so that one end of the lock nut formed with the stepped blocking portion is configured with a shrinkage section;

the connecting base is a hollow ring body with an enlarged lug on one end configured to press the connecting base inward, a diameter of the enlarged lug is greater than a diameter of the shrinkage section so the enlarged lug is configured to rest on a periphery of the shrinkage section when the connecting base is pressed inward; another end of the connecting base has a plurality of spring plates separated from each other with space between and stretched out, metal claws and undercuts are respectively configured inside and outside of the spring plates, a gradually shrinkage inclined portion is formed on the outer margin of the undercut toward the side of the spring plates; and the O-ring seal piece is placed in the first opening of the joint body so that the O-ring seal piece can be loaded on the cam ring of the joint body, the connecting base transmits from the shrinkage section into the lock nut from one end of the lock nut with the spring plates so that the undercut and the stepped blocking portion can limit each other and the lock nut can cover the auxiliary retaining ring, when the lock nut using the second thread section to thread with the first thread section on the joint body, the auxiliary retaining ring is placed between the connecting base, and the O-ring seal piece and the first end are adjacent to the spring plates, and a pipe is configured to sequentially pass through the connecting base, the lock nut, the auxiliary retaining ring, and the O-ring seal piece to insert into the joint body, and the metal claws are coupled with an outer periphery of the pipe; and through the lock nut, the connecting base is configured to push the auxiliary retaining ring against the O-ring seal piece such that the O-ring seal piece is configured to couple with the pipe, and the function inclined plane is configured to push and tighten the shrinkage inclined portion inwardly so as to enable the metal claws to grasp and secure the position of the pipe.

2. The joint pipe structure of claim 1, wherein the first opening and the second opening of the joint body is transmit in a straight line way.

3. The joint pipe structure of claim 1, wherein the first opening and the second opening of the joint body is transmit in a corner line way.

4. The joint pipe structure of claim 1, wherein the metal claws combine with the spring plates by stretching to cover, and the metal claws is slightly protruding to the inner margin of the spring plates.

* * * * *